July 28, 1953  M. A. DONOHOE  2,646,723
CHUCK AND METHOD OF CHUCKING
Filed Jan. 25, 1947  2 Sheets-Sheet 1

MARTIN A. DONOHOE
Inventor

By

Attorney

July 28, 1953  M. A. DONOHOE  2,646,723
CHUCK AND METHOD OF CHUCKING
Filed Jan. 25, 1947  2 Sheets-Sheet 2
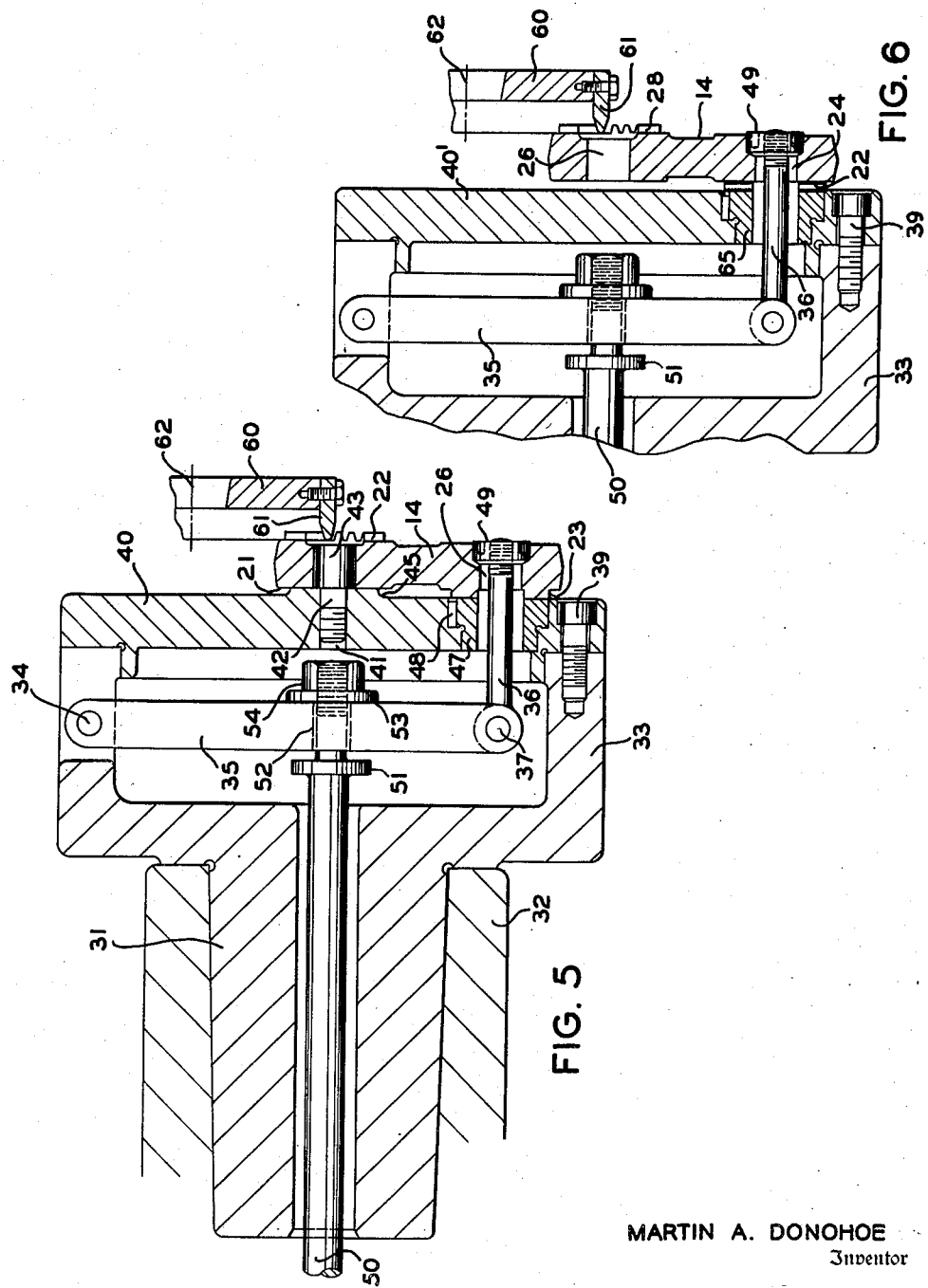
MARTIN A. DONOHOE
Inventor
By
Attorney Patented July 28, 1953

2,646,723

UNITED STATES PATENT OFFICE 2,646,723

CHUCK AND METHOD OF CHUCKING

Martin A. Donohoe, Gates, N. Y., assignor to Gleason Works, Rochester, N. Y., a corporation of New York Application January 25, 1947, Serial No. 724,340

12 Claims. (Cl. 90—1)

1

The present invention relates to a method of producing the cheek members of built-up crank shafts, and to a chuck for holding a cheek member while a machining operation is being performed on the cheek member. In a more specific aspect, the invention relates to a method and to apparatus for chucking cheek members of built-up crank shafts during machining of coupling teeth thereon.

In a built-up crank shaft, the shaft ends, the crank pins, the main bearing pins, and the cheeks are all made as separate parts and then bolted together. It is the practice to provide adjoining parts of the crank shaft with complementary face clutch or coupling teeth so that when the parts are bolted together, the mating clutch or coupling members will hold the parts of the crank shaft securely against rotation relative to one another, and the assembled crank shaft will operate just as though it were made in a single piece.

Since each cheek member of a shaft has to be connected on opposite sides either to a crank pin and a main bearing pin or to one of these pins and a shaft end, it is necessary to provide each cheek member with clutch or coupling teeth on both its sides. These two sets of clutch or coupling teeth have to be off-set from one another and ordinarily the centers or axes of the two sets of teeth are spaced 180 degrees apart.

For machining the teeth of the cheek portions of a built-up crank shaft, it has heretofore been the practice either to turn or grind the periphery of the cheek and then chuck the cheek by its periphery while machining each set of coupling teeth thereon, or to bore a special hole in the cheek and chuck the cheek by such hole while performing each tooth-machining operation. In either case, the chucking surface is eccentric to the two coupling members whose teeth are to be cut, and it is difficult to mount the cheek on the tooth-cutting machine, cut the teeth on one side, reverse the mounting, and cut the teeth on the other side, and secure the necessary accuracy in off-set relation of the two coupling members which is essential if the crank shaft parts are to go together correctly when assembled. Moreover, with either prior method of chucking the work, extra expense is involved in the manufacture of the cheek member because the chucking surface serves no useful purpose when the built-up crank shaft has been assembled and is in operation. Furthermore, especially when the chucking is done by the periphery of the cheek member, large, expensive chucking equipment is required and special pot-type chucks must be used.

2

One object of the present invention is to provide a simpler and less costly method for holding cheek members of built-up crank shafts during machining of the teeth thereon, and one which will result in cheek members of increased accuracy.

Another object of the invention is to provide a new and improved type of chuck for holding cheek members of a built-up crank shaft during machining of the coupling teeth thereon.

Other objects of the invention will be apparent hereinafter from the specification and from the recital of the appended claims.

Figure 4:
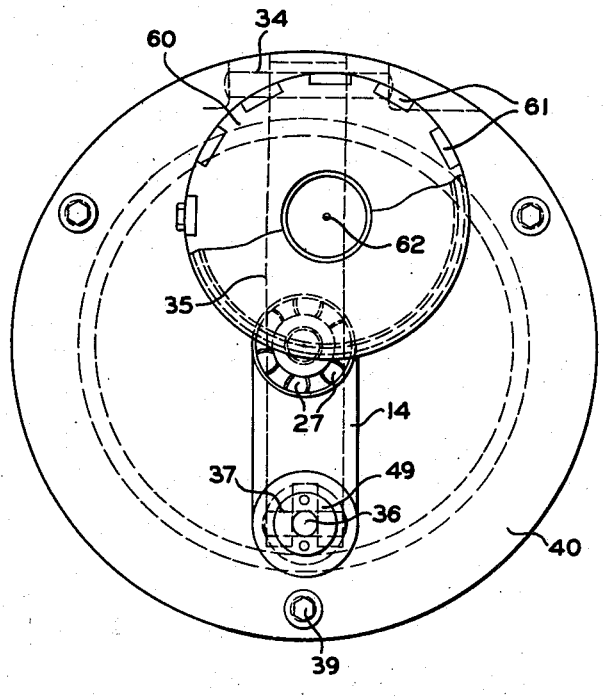

Fig. 4 is an elevational and Fig. 5 a longitudinal sectional view showing a chuck made according to the present invention for holding a cheek member during machining of coupling teeth thereon, and illustrating the operation of machining the teeth at one side of the cheek member; and Fig. 6 is a fragmentary sectional view corresponding to Fig. 5 but showing the chuck for holding the cheek member during machining of the teeth on the opposite side thereof, and illustrating this machining operation.

In machining the coupling teeth on a cheek member of a built-up crank shaft by the process of the present invention, the cheek member is first secured in a chuck with the axis of the clutch or coupling teeth, which are to be machined on one side of the work, aligned with the axis of the work spindle of the cutting machine. Alignment of work and work spindle axes is obtained by locating the cheek from the hole that is provided for the bolt, which is to connect the cheek to an adjoining part of the crank shaft. Correct axial position of the cheek in the machine is obtained by locating the cheek from the top of the coupling member which is to be produced on the other side of the cheek. After machining the teeth in this one side of the cheek, the cheek is reversed and chucked by engaging the coupling teeth just machined in the work with a complementary toothed portion which is provided in the chuck and whose center is located at the exact radial distance from the axis of the work spindle of the cutting machine as the distance between the axes of the two coupling members required on the opposed side surfaces of the cheek. Thus the axis of the coupling member, which is to be machined on the second side of the cheek, is held in alignment with the axis of the work spindle of the cutting machine and correctly located axially of that spindle. In this way, the work is so positioned that coupling teeth can be cut in the second side of the cheek which are spaced at the correct radial distance from the coupling teeth cut in the first side of the cheek.

Referring now to the drawings by numerals of reference, 10 and 11 denote the opposite end members, 12, the main bearing pin, 13, the crank-pins, and 14, the cheek members of a built-up crank shaft. In the crank shaft shown, the cheek members are of different lengths so that the several crank pins 13 are at the correct radial distances from the main axis 15 of the crank shaft. Each cheek member 14 is provided on its opposite side faces with face clutch teeth that are adapted to engage and mesh with mating face clutch teeth that are formed on those adjoining parts of the crank shaft with which each cheek is associated, namely, the crank shaft ends, main bearing pins, or crank pins, depending upon the position of the particular cheek member in the shaft. Each of the crank pins and main bearing pins has, in turn, face clutch teeth formed on its two ends to mesh with the face clutch teeth formed on opposed sides of the two adjoining cheek members, while each of the crank shaft ends 10 and 11 has face clutch teeth formed on one end to mesh with face clutch teeth formed on opposite sides of the end cheek members of the shaft. The several parts of the crank shaft are bolted together, a bolt securing, for instance, a crank pin or main bearing pin and the two adjoining cheek members together, and a bolt securing each shaft end and the adjoining cheek member together. The clutch teeth serve to prevent relative rotation between the parts after they are bolted together so that the crank shaft, when assembled, operates as a single unit.

Figure 1:
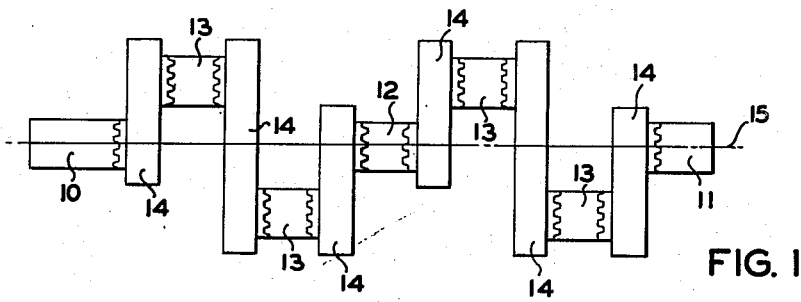
Fig. 1 is an elevational view of a conventional form of built-up crank shaft.
Figure 2:
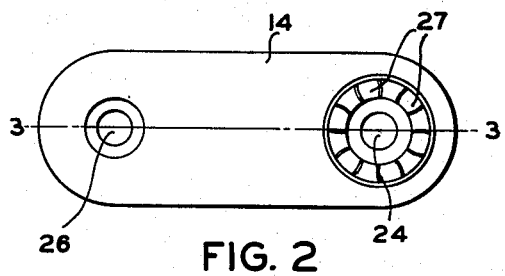
Fig. 2 is a view looking at one side of one of the cheek members of this crank shaft, the view being on a considerably enlarged scale.
Figure 3:
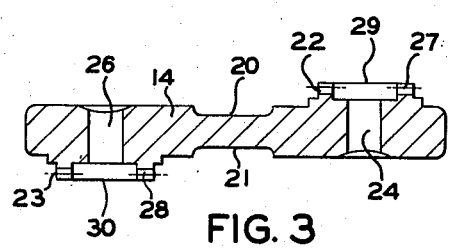
Fig. 3 is a sectional view through the cheek member, taken on the line 3—3 of Fig. 2.

One of the cheek members 14 of the crank shaft is shown on enlarged scale in Figs. 2 and 3. Its opposite side surfaces are designated 20 and 21, respectively. From the two side surfaces there project, respectively, annular bosses or protruding portions 22 and 23 which are coaxial of the bolt holes 24 and 26, respectively, through which extend the bolts (not shown) by which the cheek member is secured to adjoining parts of the crank shaft. The bosses 22 and 23 are provided with face clutch teeth 27 and 28, respectively, which are coaxial of the respective bolt holes 24 and 26, respectively. The tops of these teeth lie in planes 29 and 30, respectively which are perpendicular to the axes of bolt holes 24 and 26, respectively. These clutch teeth are adapted to engage complementary face clutch teeth formed, as already described, on adjoining parts of the crank shaft to secure the cheek members to these adjacent parts against rotation relative thereto.

Any suitable form of face clutch teeth may be provided in the several parts of the crank shaft. In the drawings, the coupling portions are shown as provided with teeth whose opposite sides are longitudinally curved. Thus the teeth 27 of coupling member 22 have opposite sides which are longitudinally convex. Clutch or coupling members of this type are disclosed in Wildhaber U. S. Patent No. 2,384,582, issued September 11, 1945.

Figs. 4 and 5 illustrate the machining of the teeth, such as the teeth 27 on one side of a cheek 14, and one form of chuck that may be used during this operation. The chuck comprises a stem or arbor portion 31 and a head portion 33. The stem portion 31 is tapered and is adapted to be received in the correspondingly tapered bore of the work spindle 32 of the gear-cutting or gear-grinding machine. The head portion 33 is adapted to seat against the face of the work spindle.

The head portion 33 is hollow and has a lever 35 pivotally mounted therein by means of a pin 34. This lever has a bolt 36 pivotally connected to its free end by means of the pin 37. Secured to the front face of the head 33 by means of screws 39 is a cover plate 40. This plate has a centrally disposed threaded opening 41 in it which is adapted to receive a stud 42 that has an enlarged cylindrical head 43. The center of the hole 41 is coaxial with the stem portion 31 of the chuck and so is the head 43 of stud 42. The stud head 43 is adapted to enter the hole 24 of the cheek member 14 to locate that hole and the boss 22, which is coaxial thereof, coaxially of the work spindle when the chuck is mounted on the work spindle.

The cover plate 40 also has a bushing or seating member 47 mounted therein. This bushing is mounted in the cover plate so that its axis is at the same radial distance from the center of hole 41 as the distance between the axes of bolt holes 24 and 26 of the cheek member 14 to be machined. It is held against rotation relative to cover plate 40 by a key 48. The front face of the bushing is plane so that the plane top surface 30 of the boss 23 may be seated thereagainst to locate the cheek member 14 axially of the work spindle when the chuck is mounted on the work spindle.

The cover plate 40 also has a boss 45 formed centrally thereon coaxial of hole 41. The front of this boss is plane to provide a seat for face 21 of the cheek.

For the cutting of face clutch teeth 27, then, the cheek member 14 has its face 21 seated agains boss 45 formed on the front face of the disc 40, the top surface 30 of what is ultimately to be the tips of the teeth of the coupling portion 23 of the cheek seated against the plane front face of a bushing 47, and its bolt opening 24 centered on and by stud head 43. The cheek is clamped to the chuck by bolt 36. This bolt is adapted to pass through the bore of bushing 47 and is adapted to have a nut 49 threaded thereon which is adapted to engage in the bolt-hole 26 of the cheek. Clamping is effected by rearward movement of a draw-bar 50 which is mounted to reciprocate in the bore of the arbor portion 31 of the chuck. This draw-bar is adapted to be actuated by any suitable mechanism on the cutting machine, such as a conventional form of fluid-pressure operated piston. The draw-bar 50 is formed with a collar 51 and has its diameter somewhat reduced forwardly of said collar to enter a hole 52 formed in the lever 35. A washer 53 and nut 54, that threads on the reduced portion of the draw-bar, serve to swing the lever 35 rearwardly and effect clamping of the cheek 14 when the draw-bar is drawn rearwardly. Collar 51 serves to release the chuck by engagement with lever 35 when the draw-bar is moved forwardly.

A coupling member 22, such as shown in the drawings, may be cut according to the method of Wildhaber application Serial No. 520,463, filed January 31, 1944. For this purpose a face-mill cutter, such as denoted at 60, may be rotated in engagement with the work while the work is held stationary. Opposite sides of spaced teeth of the work may be cut simultaneously by the cutting blades 61 of the cutter. After a pair of tooth sides have been cut, the cutter is withdrawn from engagement with the work and the work indexed by rotation of the work spindle 32 of the cutting or grinding machine on its axis.

For cutting the coupling member 23 at the opposite side of the cheek member 14, a chuck differing somewhat in construction from that of Fig. 5 is used. In this case, the cheek member 14 is located solely by the teeth 27 previously cut in the work. For this purpose a cover plate 40' may be substituted in the chuck for the plate 40 previously described. The plate 40' has a bushing 65 mounted in it eccentric of arbor 31 of the chuck, and whose axis is off-set from the axis of arbor 31 the same distance as between the centers of bolt holes 24 and 26 of the cheek member which is being machined. This bushing 65 has teeth formed on its front face which are coaxial of the bushing and complementary to the teeth 27 of coupling member 22 and which are adapted to engage in the tooth spaces of the coupling member 22. The height of the teeth of the bushing 65 is preferably such that its teeth bottom in the tooth spaces of the coupling member 22. The plate 40' carries no stud 42 and has no boss like boss 45 of plate 40. Clamping is done, however, by nut 49 and bolt 36, bolt 36 being adapted to be passed through bushing 65 and hole 24 of cheek 14 and nut 49 being adapted to engage in hole 24. When the draw-bar 50 of the chuck is drawn rearwardly, then, the cheek member 14 will be clamped by bolt 36 and nut 49 and held against rotation relative to the chuck by the interengaging teeth of bushing 36 and coupling member 22. Thus the work will be held just as rigidly to the chuck as it would be clamped to an adjoining part of its built-up crank shaft when in use. The teeth 28 of the work again may be cut according to the process disclosed in the co-pending application of Wildhaber, Serial No. 520,463, above mentioned. In this case, a face-mill cutter 60, having all inside blades 61, may be used, identical with the cutter employed for cutting the teeth 27 at the opposite side of the cheek. If desired, however, the teeth of the clutch member 22 at one side of the cheek 14, may be cut with a cutter having all inside cutting blades and the teeth of the coupling member 23 at the opposite side of the cheek may be cut with a face-mill cutter having all outside blades, or vice versa, as will be understood from the Wildhaber application mentioned.

In the machining operation, on coupling member 23, as on coupling member 22, the cutter is rotated on its axis while the work is held stationary. Then the cutter is withdrawn from engagement with the work and the work indexed by rotating the work spindle of the gear-cutting machine on its axis.

The method of chucking the work according to this invention and the general form of chuck employed may be used regardless of what type of teeth are cut in the face clutch member and regardless of what kind of tool is used in the machining operation. By provision of a suitable bushing 65, any form of face clutch teeth can be handled in the chuck.

As will be obvious, the method of chucking employed in this invention eliminates the necessity for precise turning and grinding of the cheeks and obviates the requirement for drilling of any special chucking holes therein. The cost of the cheeks is therefore held to a minimum, but better chucking and a more accurate job is nevertheless secured.

It will be understood that while the invention has been described in connection with a particular embodiment thereof, it is capable of further modification, and this application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of machining the teeth in a member which is adapted to have two sets of face clutch teeth formed on its opposite sides that are coaxial, respectively, with two different axes which are offset from one another, which comprises machining one set of teeth while locating the work radially relative to the cutting tool from a hole disposed centrally of the teeth that are to be machined in said side and while locating the work axially relative to the tool from the surface which is adapted to contain the tips of the teeth that are to be machined on the other side, and then machining the teeth on the second-named side of the member while locating the work axially and radially relative to the tool from the teeth machined in the first-named side.

2. The method of machining the teeth in a member which is adapted to have two sets of off-set face clutch teeth on its opposite sides, respectively, which comprises first locating the work relative to a cutting tool from a hole disposed centrally of the teeth that are to be machined on one side of the work and from the surface which is adapted to contain the tips of the teeth on the other side of the work, and actuating the tool to cut teeth on the first side of the work and periodically indexing the work about an axis coinciding with the axis of the hole and with the axis of said first set of teeth, until all of the teeth of one set of clutch teeth have been cut on one side of the work, then relocating the work by holding it by the first set of clutch teeth cut therein, and then cutting the clutch teeth of the second set by actuating a tool while periodically indexing the work about an axis coinciding with the axis of said second set of teeth and off-set from the axis of said first set a distance equal to the distance between the axes of the two sets.

3. A rotatable chuck for chucking a workpiece which has two sets of face teeth on its opposite sides, respectively, disposed, respectively about axes offset from one another, which chuck comprises a rotary support mountable coaxially with the work spindle of a tooth cutting machine, locating means carried by said support and engageable with one set of teeth of the work and disposed about an axis offset from the axis of the chuck a distance equal to the distance between the axes of said two sets of teeth, said locating means comprising means for determining the position of the work axially of said chuck, and means for securing the work piece to said support.

4. A rotatable chuck for chucking a workpiece which has two sets of face teeth on its opposite sides, respectively, disposed, respectively about axes offset from one another, which chuck comprises a part mountable coaxially with the work spindle of a tooth cutting machine, a plate which is secured to said part, a bushing removably mounted in said plate with its bore offset from the axis of said part, said bushing having a surface which is adapted to engage the work, when the work is secured in the chuck, to locate the work axially of the chuck, a work-clamping member, and means reciprocable in the bore of said bushing for moving said clamping member to and from work-clamping position.

5. A rotatable chuck for chucking a workpiece which has two sets of face teeth on its opposite sides, respectively, disposed, respectively, about axes offset from one another, comprising a member mountable coaxially with the work spindle of a tooth cutting machine, a plate removably secured to said member, a plurality of locating members on said plate disposed about a hole in the plate which is offset from the axis of the chuck a distance equal to the offset between the axes of the two sets of teeth in the workpiece, and a clamping member mounted to reciprocate in said hole parallel to the axis of the chuck and to engage and clamp the workpiece to the chuck.

6. A rotatable chuck for chucking a workpiece which has two sets of face teeth on its opposite sides, respectively, disposed, respectively, about axes offset from one another, comprising a member mountable coaxially with the work spindle of a tooth cutting machine, a plate removably secured to said member, a bushing removably mounted in said plate with the axis of its bore offset from the axis of the chuck a distance equal to the offset between the axes of the two sets of teeth in the workpiece, and a clamping member mounted to reciprocate in said bore parallel to the axis of the chuck and to engage and clamp the workpiece to the chuck, said bushing having a front face adapted to engage the workpiece to locate the workpiece axially of the chuck.

7. A rotatable chuck for chucking a workpiece which has two sets of face teeth on its opposite sides, respectively, disposed, respectively, about axes offset from one another, comprising a member mountable coaxially with the work spindle of a tooth cutting machine, a plate removably secured to said member, a bushing mounted in said plate with the axis of its bore offset from the axis of the chuck a distance equal to the offset between the axes of the two sets of teeth in the workpiece, and a clamping member mounted to reciprocate in said bore parallel to the axis of the chuck and to engage and clamp the workpiece to the chuck, said bushing having a front face adapted to engage the workpiece to locate the workpiece axially of the chuck and a member secured in said plate coaxially with the chuck and adapted to enter a hole in the workpiece which is coaxial with one set of its teeth, to locate the workpiece coaxially with the chuck.

8. A rotatable chuck for chucking a workpiece which has two sets of face teeth on its opposite sides, respectively, disposed, respectively, about axes offset from one another, comprising a member mountable coaxially with the work spindle of a tooth cutting machine, a plate removably secured to said member, a bushing mounted in said plate with the axis of its bore offset from the axis of the chuck a distance equal to the offset between the axes of the two sets of teeth in the workpiece, and a clamping member mounted to reciprocate in said bore parallel to the axis of the chuck and to engage and clamp the workpiece to the chuck, said bushing having a front face adapted to engage the workpiece to locate the workpiece axially of the chuck, and said bushing having face teeth on its front face adapted to be engaged with one set of teeth of the workpiece.

9. A rotatable chuck for chucking a work piece which has two sets of face teeth on its opposite sides, respectively, disposed, respectively, about axes offset from one another, which chuck comprises a body having a surface of revolution mountable co-axially with the work spindle of a tooth cutting machine and a set of face teeth adapted to mate with one of said two sets of face teeth and disposed about an axis offset from the axis of said surface of revolution by a distance equal to the offset of the axes of said two sets of face teeth, work piece clamping means including a bolt disposed and movable relative to the chuck body substantially along the axis about which the face teeth of the chuck are disposed, a draw rod movable relative to the chuck body axially of said surface revolution, and means pivoted relative to the chuck body for transmitting motion between the draw rod and said bolt.

10. A rotable chuck for a workpiece which when completed has a set of face clutch teeth on each of two opposite sides, the two sets of teeth being disposed respectively about axes offset from each other, which chuck comprises a rotary support mountable coaxially with the work spindle of a tooth cutting machine, locating means carried by said support and engageable with one set of teeth of the work, said locating means comprising a set of teeth mating with said one set of teeth of the work for determining the position of the workpiece axially, radially and angularly relative to the chuck, and said set of teeth comprising the locating means being parallel to and offset from the axis of the chuck by a distance equal to the distance between the axes of the two sets of teeth of the workpiece, and means for securing the workpiece to said support by clamping together said mating sets of teeth.

11. The method of machining the teeth in a workpiece which is to have a set of face clutch teeth on each of two opposite sides thereof, the two sets of teeth being disposed respectively about axes offset from each other, which comprises cutting the set of teeth on one side while locating the workpieces, both in the direction of said axes and angularly relative to axes, from the surface containing the tips of the teeth that are to be machined on the other side, and then cutting the last-mentioned teeth while locating the workpiece, in the direction of said axes, in directions radial of said axes, and also angularly of said axes, from the tooth surfaces so cut on the first-mentioned side of the workpiece.

12. The method of machining the teeth in a workpiece which is to have a set of face clutch teeth on each of two opposite sides thereof, with the two sets of teeth disposed respectively about axes offset from each other and the teeth of each set each having at least one side surface thereof inclined to the axis of the set, which comprises first cutting the set of teeth in one side of the work, and then cutting the set of teeth in the other side while locating the workpiece, in the direction of said axes, in directions radially of said axes and also angularly of said axes, from the side surfaces of the teeth so cut on the first-mentioned side of the workpiece.

MARTIN A. DONOHOE.

References Cited in the file of this patent

UNITED STATES PATENTS

| Number | Name | Date |
|---|---|---|
| 135,218 | Greenough | Jan. 28, 1873 |
| 1,022,761 | Stvanek | Apr. 9, 1912 |
| 1,110,396 | Marks | Sept. 15, 1914 |
| 1,280,892 | Steenstrup | Oct. 8, 1918 |
| 1,380,286 | Anderson et al. | May 31, 1921 |
| 1,656,624 | Finsen | Jan. 17, 1928 |
| 1,673,488 | Bishop | June 12, 1928 |
| 2,401,078 | Johnson | May 28, 1946 |
| 2,463,156 | Day | Mar. 1, 1949 |

OTHER REFERENCES

American Machinist, July 3, 1947, page 127.